United States Patent
Huang et al.

(10) Patent No.: US 11,169,603 B2
(45) Date of Patent: Nov. 9, 2021

(54) ELECTRONIC APPARATUS AND METHOD FOR RECOGNIZING VIEW ANGLE OF DISPLAYED SCREEN THEREOF

(71) Applicant: Acer Incorporated, New Taipei (TW)

(72) Inventors: Chih-Wen Huang, New Taipei (TW); Chao-Kuang Yang, New Taipei (TW); Wen-Cheng Hsu, New Taipei (TW)

(73) Assignee: Acer Incorporated, New Taipei (TW)

( * ) Notice: Subject to any disclaimer, the term of this patent is extended or adjusted under 35 U.S.C. 154(b) by 64 days.

(21) Appl. No.: 16/681,762

(22) Filed: Nov. 12, 2019

(65) Prior Publication Data
US 2021/0048881 A1    Feb. 18, 2021

(30) Foreign Application Priority Data
Aug. 14, 2019   (TW) ................... 108128825

(51) Int. Cl.
*G06F 3/01*   (2006.01)
*G06T 19/20*  (2011.01)
*G06N 3/067*  (2006.01)

(52) U.S. Cl.
CPC ............. *G06F 3/013* (2013.01); *G06N 3/067* (2013.01); *G06T 19/20* (2013.01)

(58) Field of Classification Search
CPC ...................................... G06F 3/013
See application file for complete search history.

(56) References Cited

U.S. PATENT DOCUMENTS

| 2018/0012330 A1 | 1/2018 | Holzer et al. |
| 2021/0034906 A1* | 2/2021 | Van Welzen ......... G06K 9/3266 |

FOREIGN PATENT DOCUMENTS

| JP | 2006287589 | 10/2006 |
| TW | 201019309 | 5/2010 |
| TW | 201035913 | 10/2010 |

OTHER PUBLICATIONS

J. David Smith and T. C. Nicholas Graham. 2006. Use of eye movements for video game control. In Proceedings of the 2006 ACM SIGCHI international conference on Advances in computer entertainment technology (ACE '06). Association for Computing Machinery, New York, NY, USA, 20-es. (Year: 2006).*

* cited by examiner

*Primary Examiner* — Shivang I Patel
(74) *Attorney, Agent, or Firm* — JCIPRNET

(57) ABSTRACT

An electronic apparatus and a method for recognizing view angle of displayed screen thereof. The method is adapted to the electronic apparatus and includes the following steps. A first person view screen displayed by a display is captured. A specific object in the first person view screen is removed to generate a preprocessed image. The preprocessed image is inputted into a neural network model to recognize a view angle of the first person view screen. A function is performed according to the view angle of the first person view screen.

14 Claims, 6 Drawing Sheets

ELECTRONIC APPARATUS AND METHOD FOR RECOGNIZING VIEW ANGLE OF DISPLAYED SCREEN THEREOF

CROSS-REFERENCE TO RELATED APPLICATION

This application claims the priority benefit of Taiwan application serial no. 108128825, filed on Aug. 14, 2019. The entirety of the above-mentioned patent application is hereby incorporated by reference herein and made a part of this specification.

BACKGROUND

Technical Field

The invention relates to an electronic apparatus, and more particularly, to an electronic apparatus and a method for recognizing view angle of displayed screen thereof.

Description of Related Art

With the advancement of technology, in pursuit of immersive experience, users can no longer be satisfied with watching two-dimensional images. In order to provide the users with a more realistic and stereoscopic visual experience, many applications have been developed to simulate a three-dimensional virtual scene for the users to watch the three-dimensional virtual scene through a display or to even interact with the three-dimensional virtual scene. In certain applications, a three-dimensional virtual scene image displayed by the display is an image generated in a first person view based on a first person control. In the first person view, images seen by a user are like images seen through eyes of a simulated digital substitute, wherein a view angle of the simulated digital substitute is controlled by the user through an input device or by moving the body. In other words, through the operation of the input device or the action of body parts, the user can watch the three-dimensional scene content corresponding to different view angles. For example, when the user plays a first person view game, a screen content displayed by the display is a scene content of the three-dimensional virtual scene watched by a game character (namely, the simulated digital substitute) based on the view angle. In response to the input device operated by the user or the body parts moved by the user, the view angle of the game character is changed accordingly.

SUMMARY

Accordingly, the invention provides an electronic apparatus and a method for recognizing view angle of displayed screen thereof. The view angle of a first person view screen is recognized through a neural network (NN) model for use in subsequent applications.

An embodiment of the invention provides a method of recognizing view angle of displayed screen. The method is adapted to an electronic apparatus and includes the following steps: capturing a first person view screen displayed by a display, removing a specific object in the first person view screen to generate a preprocessed image, inputting the preprocessed image into a neural network model to recognize a view angle of the first person view screen, and performing a function according to the view angle of the first person view screen.

An embodiment of the invention provides an electronic apparatus. The electronic apparatus includes a display, a storage device and a processor. The processor is coupled to the storage device and the display, and configured to execute the following steps: capturing a first person view screen displayed by the display, removing a specific object in the first person view screen to generate a preprocessed image, inputting the preprocessed image into a neural network model to recognize a view angle of the first person view screen, and performing a function according to the view angle of the first person view screen.

Based on the above, in the embodiments of the invention, after the first person view screen is preprocessed to remove the specific object, the preprocessed image is inputted into the neural network model to recognize the view angle of the first person view screen. Here, after the specific object in the first person view screen is removed, a recognition accuracy of the neural network model can be improved. In addition, after the view angle of the first person view screen is recognized, a specific function can be executed according to the view angle of the first person view screen to increase a functionality of the electronic apparatus.

In order to make the aforementioned and other objectives and advantages of the invention comprehensible, embodiments accompanied with figures are described in detail below.

DESCRIPTION OF THE EMBODIMENTS

Several embodiments of the invention will be described in detail below with reference to the accompanying drawings. For reference symbols used in the following descriptions, same reference symbols in different drawings represent same or similar components. These embodiments are merely a part of the present disclosure, and do not disclose all possible implementations of the invention. More specifically, these embodiments are merely examples of a method and an apparatus in the claims of the invention.

Figure 1:
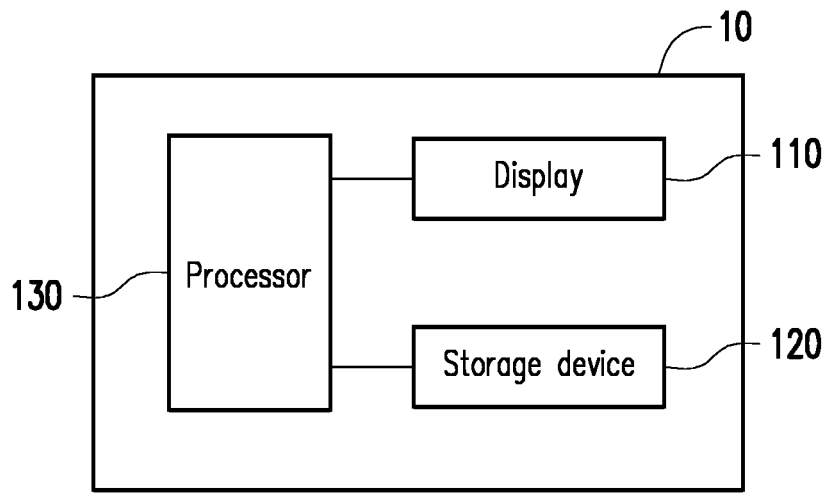
FIG. 1 is a schematic diagram of an electronic apparatus illustrated according to an embodiment of the invention.

FIG. 1 is a schematic diagram of an electronic apparatus illustrated according to an embodiment of the invention, and is for the convenience of description instead of limiting the invention. Referring to FIG. 1, an electronic apparatus 10 is, for example, a notebook computer, a desktop computer, a tablet computer, a head-mounted display device, a game machine, a smart phone, a smart television, a server device or a combination thereof, but the invention is not limited thereto. In the embodiment of the invention, the electronic apparatus 10 includes a display 110, a storage device 120, and a processor 130.

The display 110 is, for example, a liquid crystal display (LCD), a light-emitting diode (LED) display, an organic light-emitting diode (OLED) display or a display of other types, and the invention is not limit thereto. From another point of view, the display 110 can be an independent display, a notebook computer display, a head-mounted display device display, or a display integrated onto other types of electronic apparatus. The invention is not limited in this regard.

The storage device 120 is used to store data including a virtual reality image content, a programming code and a software element, and can be, for example, a fixed or movable random access memory (RAM), a read-only memory (ROM), a flash memory, a hard disk in any mode, or other similar apparatuses, an integrated circuit or a combination thereof.

The processor 130 is, for example, a central processing unit (CPU), or a programmable microprocessor, a digital signal processor (DSP), a programmable controller, an application specific integrated circuit (ASIC), a programmable logic device (PLD), a graphics processing unit (GPU) with general purposes or special purposes, or other similar apparatuses or a combination thereof. The processor 130 can execute a programming code, a software module, a command and the like recorded in the storage device 120 to realize the method for recognizing view angle of displayed screen according to the embodiments of the invention.

However, in addition to the display 110, the storage device 120 and the processor 130, the electronic apparatus 10 further includes other elements not illustrated in FIG. 1, such as a speaker, a microphone, a camera, a communication module and the like. The invention is not limited in this regard.

Figure 2:
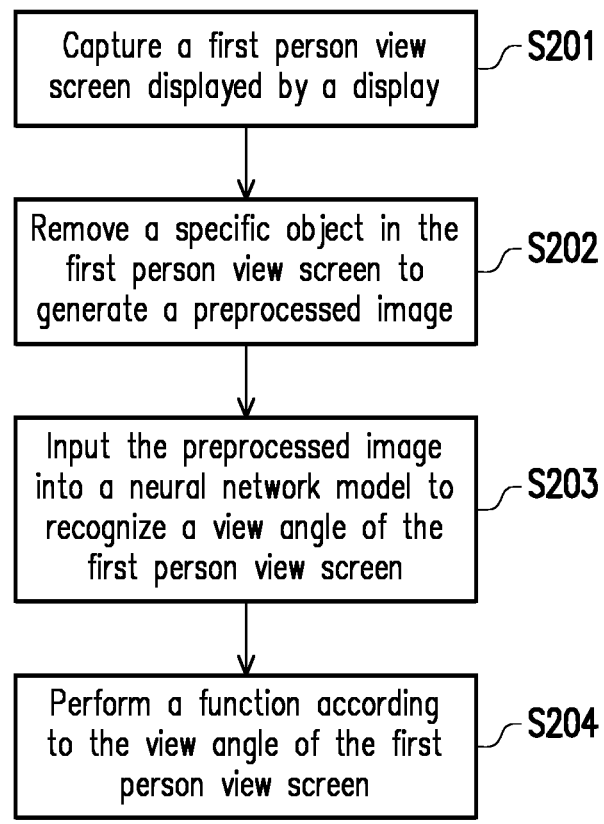
FIG. 2 is a flowchart of a method for recognizing view angle of displayed screen illustrated according to an embodiment of the invention.

FIG. 2 is a flowchart of a method for recognizing view angle of displayed screen illustrated according to an embodiment of the invention. Referring to FIG. 2, the method of the present embodiment is suitable for the electronic apparatus 10 in FIG. 1. The detailed processes of the method of the present embodiment are described below with reference to each element in the electronic apparatus 10.

It should be noted that in the embodiments of the invention, when the processor 130 of the electronic apparatus 10 executes an application program, the display 110 displays a first person view screen. The above-mentioned application program is, for example, a program that can provide a three-dimensional scenario content, such as a game program or a multimedia play program. For example, when a user utilizes the electronic apparatus 10 to play a first person view game or watch a 360-degree panoramic image/video, the display 110 displays the first person view screen. In response to an operation command given by the user through an input device (not illustrated) or movement of a body part (for example, a head), the view angle of the first person view screen is changed accordingly. For example, in response the way the user operates a touch device, a mouse or a keyboard, the processor 130 provides the first person view screen determined from the three-dimensional scenario content to the display 110 for displaying. Alternatively, in response to a posture of the head of the user wearing a head-mounted display device, the processor 130 provides the first person view screen determined from the three-dimensional scenario content to the display 110 of the head-mounted display device for displaying.

Firstly, in step S201, the processor 130 captures the first person view screen displayed by the display 110. Specifically, the processor 130 can capture the first person view screen displayed by the display 110 through an operating system or an application program interface (API). For example, the processor 130 can capture the first person view screen displayed by the display 110 through a screen capturing technology such as a desktop duplication API of the Windows operating system. Alternatively, the processor 130 can obtain the first person view screen through API of a game program. The image content of the first person view screen is generated by simulating a three-dimensional scenario watched by a digital substitute of a user watches from a view angle.

In step S202, the processor 130 removes a specific object in the first person view screen to generate a preprocessed image. In step S203, the processor 130 inputs the preprocessed image into a neural network model to recognize the view angle of the first person view screen. In an embodiment, the view angle of the first person view screen may be a vertical pitch view angle. The vertical pitch view angle may be, for example, between 0 and 180 degrees. However, in other embodiments, the view angle of the first person view screen may also be a horizontal yaw view angle.

Specifically, in the embodiments of the invention, the processor 130 can utilize the neural network model to recognize the view angle of the first person view screen, that is, to recognize the view angle of the first person view screen according to the screen features of the first person view screen. However, the first person view screen may include the specific object not beneficial to the recognition accuracy of the neural network model. Therefore, in the embodiments of the invention, before a recognition result is actually generated according to the neural network model, the first person view screen is preprocessed to remove the specific object. Correspondingly, in the training process of the neural network model, training screens in a training data set are subjected to the same preprocessing.

Generally, these specific objects not beneficial to the recognition accuracy of the neural network model are not relevant to view angle changes. In other words, these specific objects are not correspondingly changed in response to the view angle changes of the first person view screen. It is even possible that these specific objects will not be changed at all. For example, if the first person view screen is a game screen, a virtual hand or a virtual weapon located in the middle and lower part of the game screen is the specific object not beneficial to the recognition accuracy of the neural network model used to recognize view angles. Alternatively, a play control menu, a game control menu, a logo, or other static icons in the first person view screen are also the specific objects not beneficial to the recognition accuracy of the neural network model used to recognize view angles. In the embodiments of the invention, after the specific objects in the first person view screen are removed to generate the preprocessed image, by providing the preprocessed image to the neural network model for recognition, the recognition accuracy of the neural network model can be significantly improved.

In an embodiment, the processor 130 can execute an image analysis to detect the specific object. For example, the specific object in the first person view screen is detected through an object detection method, such as a color check method, an outline check method or an image comparison method. Then, the processor 130 can remove the specific object in the first person view screen by, for example, excavating out an image block including the specific object to generate the preprocessed image.

In an embodiment, the processor 130 can cut the first person view screen into a plurality of sub-screens, and take at least one of the sub-screens excluding the specific object to generate the preprocessed image. Specifically, in certain application scenarios, since the position of the specific object may not be changed significantly, the processor 130 can directly cut the first person view screen and take the image part excluding the specific object to achieve the purpose of removing the specific object.

Figure 3A:
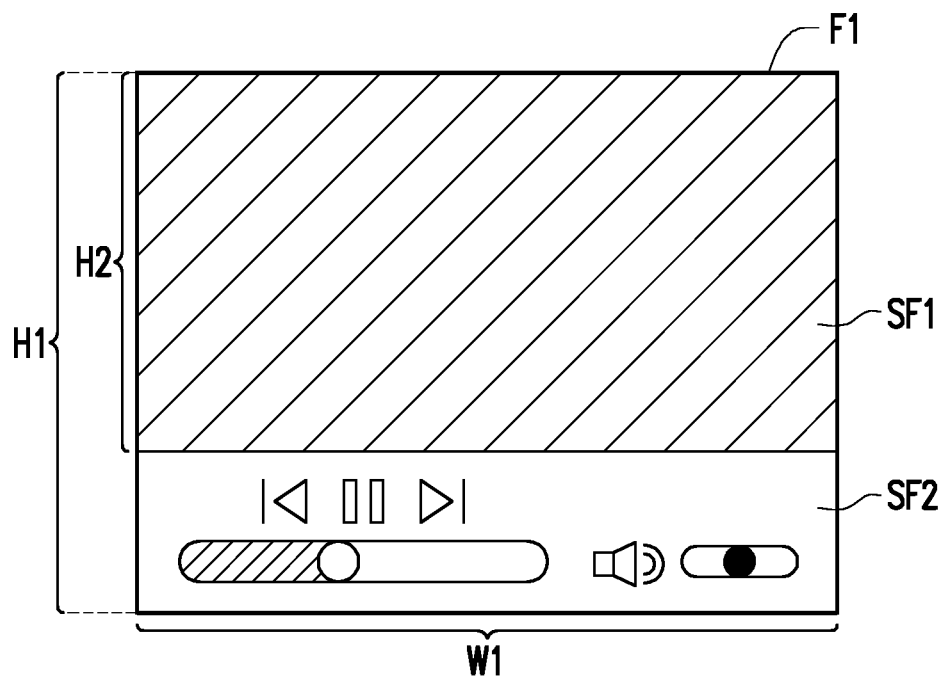
FIG. 3A and FIG. 3B are examples for generating a preprocessed image illustrated according to an embodiment of the invention.
Figure 3B:
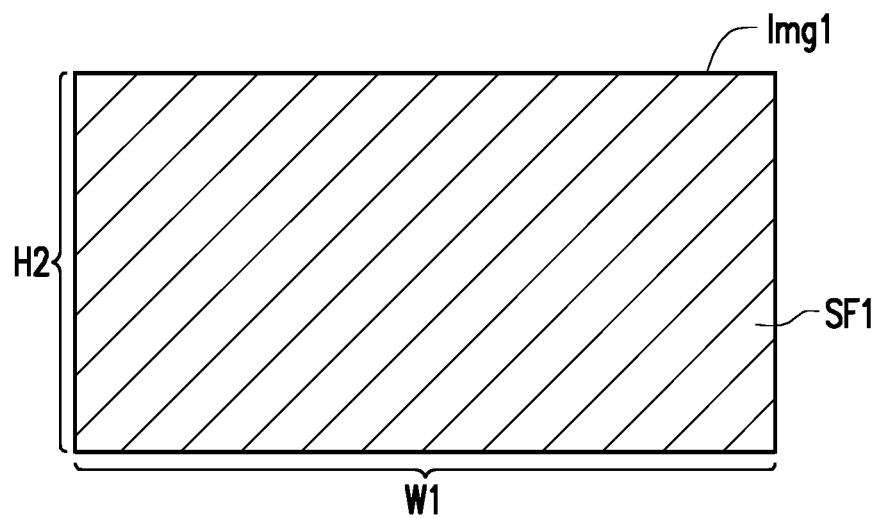

For example, FIG. 3A and FIG. 3B are examples for generating a preprocessed image illustrated according to an embodiment of the invention. Firstly, referring to FIG. 3A and FIG. 3B, in the present example, the processor 130 obtains a first person view screen F1 with a size of W1*H1. In the present example, it is assumed that a play control object is provided in a lower portion of the first person view screen F1. On that basis, the processor 130 cuts the first person view screen F1 into a sub-screen SF1 and a sub-screen SF2 arranged thereunder, and takes the sub-screen SF1 to generate a preprocessed image Img1 with a size of W1*H2, so that the preprocessed image Img1 can be utilized in subsequent steps to recognize the view angle of the first person view screen F1.

Figure 4A:
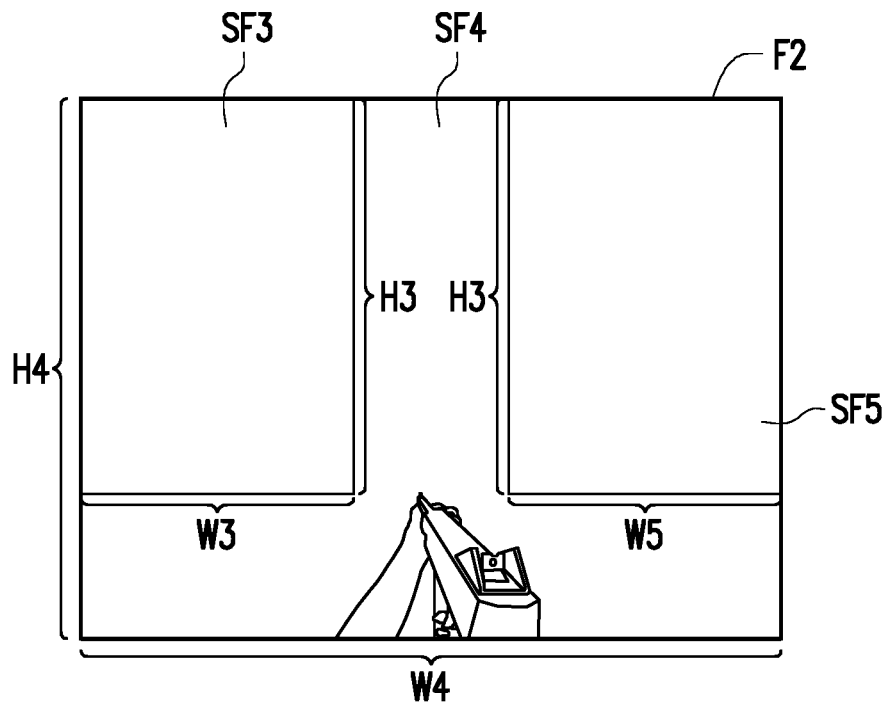
FIG. 4A and FIG. 4B are examples for generating a preprocessed image illustrated according to an embodiment of the invention.
Figure 4B:
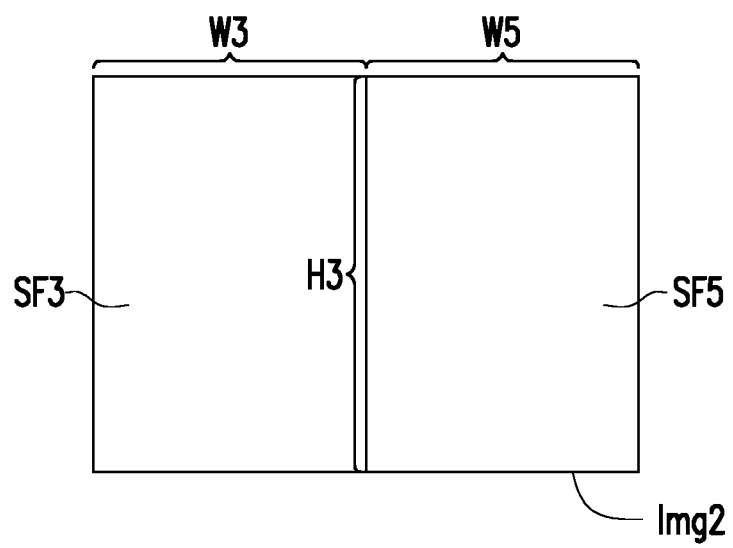

For example, FIG. 4A and FIG. 4B are examples for generating a preprocessed image illustrated according to an embodiment of the invention. Firstly, referring to FIG. 4A and FIG. 4B, in the present example, the processor 130 obtains a first person view screen F2 with a size of W4*H4. In the present example, it is assumed that a virtual hand holding a virtual weapon is provided in middle and lower portion of the first person view screen F2. On the basis, the processor 130 cuts the first person view screen F2 into a sub-screen SF3, a sub-screen SF4 and a sub-screen SF5. In other words, the sub-screens generated by cutting the first person view screen F2 include the sub-screen SF3 with a size of W3*H3, the sub-screen SF4, and the sub-screen SF5 with a size of W5*H3. The processor 130 can take the sub-screen SF3 and the sub-screen SF5 to be spliced into a preprocessed image Img2 with a size of (W3+W5)*H3, so that the preprocessed image Img2 can be utilized in subsequent steps to recognize the view angle of the first person view screen F2.

It should be noted that in an embodiment, the processor 130 can utilize a neural network model to classify a preprocessed image into one of a plurality of view angle ranges. The neural network model may be a deep neural network model or other machine learning models. The invention is not limited in this regard. For example, the neural network model may be LeNet, VGGNet, NASNet, ResNet and the like used to perform an image classification in a convolution neural network (CNN) model. The invention is not limited in this regard. The above-mentioned view angle ranges are output classification types of the neural network model.

Figure 5:
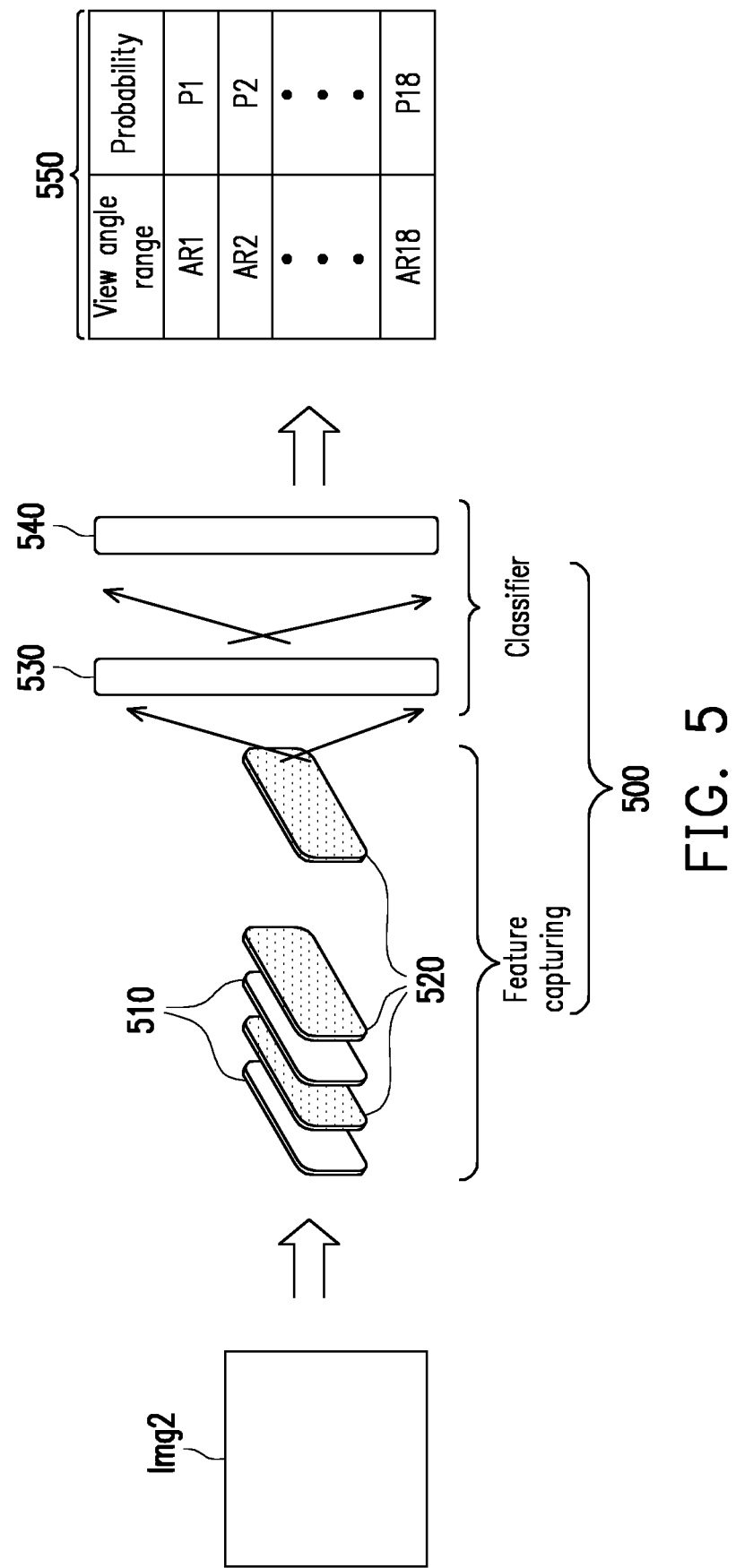
FIG. 5 is a schematic diagram of recognizing a view angle based on a neural network model illustrated according to an embodiment of the invention.

FIG. 5 is a schematic diagram of recognizing a view angle based on a neural network model illustrated according to an embodiment of the invention. Referring to FIG. 5, the preprocessed image Img2 is input to the CNN model as an example for description. In the present example, a CNN 500 is composed of at least one convolution layer 510, at least one pooling layer 520, at least one fully connected layer 530 and an output layer 540.

A front section of the CNN 500 is usually composed of the convolution layer 510 and the pooling layer 520 in series connection, and is usually utilized as a feature of images to capture a feature value of the preprocessed image Img2. The feature value can be a multi-dimensional array, and is normally regarded as a feature vector of the inputted preprocessed image Img2. A rear section of the CNN 500 includes the fully connected layer 530 and the output layer 540. The fully connected layer 530 and the output layer 540 classify the preprocessed image Img2 into one of a plurality of types according to the feature values generated by the convolution layer 510 and the pooling layer 520. Specifically, output data 550 generated by the output layer 540 can include probabilities P1 to P8 that the preprocessed image Img2 is determined as being types AR1 to AR18 by the CNN 500 so the type to which the preprocessed image Img2 belongs can be determined according to the maximum among the probabilities P1 to P8. Specifically, the types AR1 to AR18 are different view angle ranges. In the present example, a 180-degree vertical view angle range is divided into 18 10-degree view angle ranges, for example. In other words, the types AR1 to AR18 respectively correspond to the following view angle ranges: 0 degree to 10 degrees, 10 degrees to 20 degrees, 20 degrees to 30 degrees, 30 degrees to 40 degrees, . . . , 160 degrees to 170 degrees, and 170 degrees to 180 degrees. Based on the used CNN 500, the processor 130 can classify the preprocessed image Img2 into one of the 18 view angle ranges to recognize the view angle of the first person view screen F2. By classifying the preprocessed image Img2 into one of the plurality of view angle ranges while ensuring a successful recognition rate of the neural network model and achieving a recognition accuracy to certain extent, a calculation amount can be reduced to improve a processing efficiency according to the embodiments of the invention.

Finally, in step S204, the processor 130 performs a function according to the view angle of the first person view screen. The function can include providing an acousto-optic effect corresponding to the view angle or recording the view angle as a game operating history. Specifically, the processor 130 can control a speaker or a lighting device to provide a light effect or a sound effect according to the view angle of the first person view screen. Alternatively, the processor 130 can record the view angle of the user playing the first person view game as the game operating history for future reference. In this way, the functionality and entertainment of the electronic apparatus 10 can be improved.

Figure 6A:
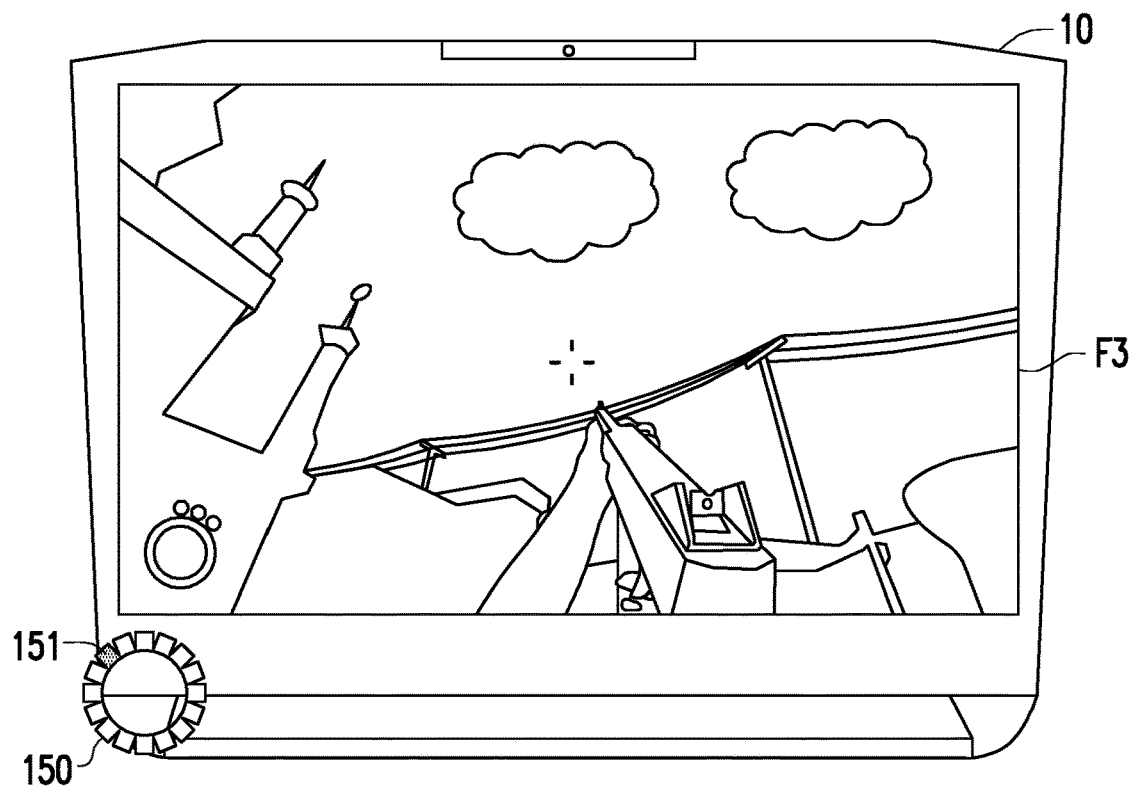
FIG. 6A to FIG. 6C are schematic diagrams illustrating a scenario of a method for recognizing view angle of displayed screen according to an embodiment of the invention.
Figure 6B:
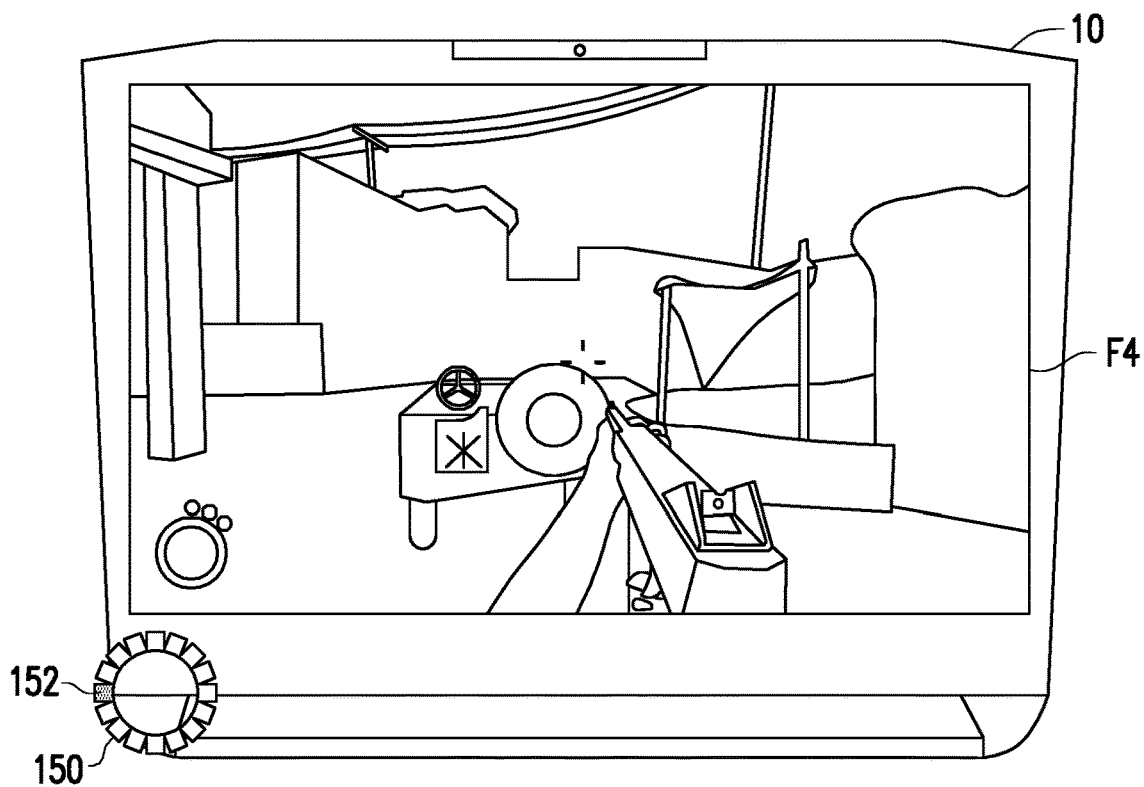
Figure 6C:
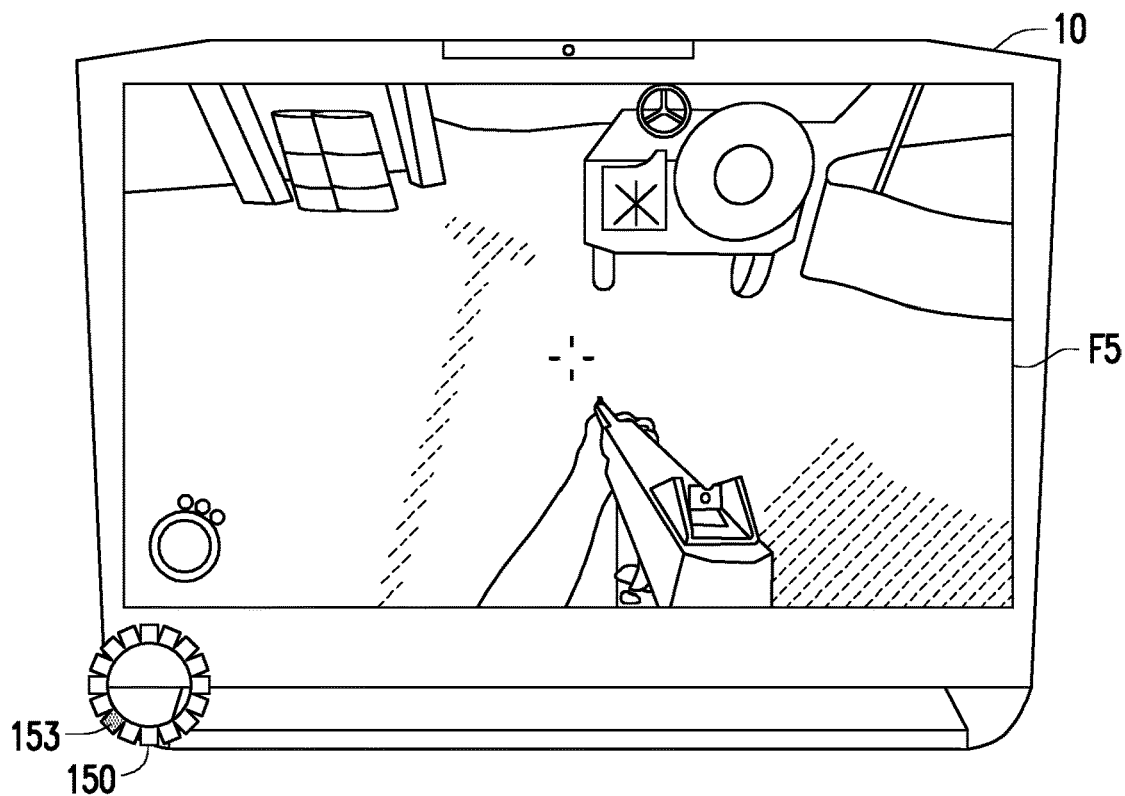

For example, FIG. 6A to FIG. 6C are schematic diagrams illustrating a scenario of a method for recognizing view angle of displayed screen according to an embodiment of the invention. Referring to FIG. 6A to FIG. 6C, the electronic apparatus 10 includes a lighting device 150. Referring to FIG. 6A, when the view angle of a first person view screen F3 is recognized as falling between 120 degrees and 140 degrees, a light 151 of the light device 150 is turned on. Referring to FIG. 6B, when the view angle of a first person view screen F4 is recognized as falling between 80 degrees and 100 degrees, a light 152 of the light device 150 is turned on. Referring to FIG. 6C, if the view angle of a first person view screen F5 is recognized as falling between 40 degrees and 60 degrees, a light 153 of the light device 150 is turned on.

It is worth mentioning that when the electronic apparatus 10 is a head-mounted display device, the processor 130 can also automatically execute a horizontal view angle correction according to the view angle of the first person view screen. Specifically, the processor 130 can calculate a difference between the view angle of the first person view screen and a default expected view angle (90 degrees during horizontal correction) to obtain a view angle offset, and correct a view angle positioning parameter of the head-mounted display device according to the view angle offset. Afterwards, the processor 130 can provide a screen subjected to view angle correction for the user.

Figure 7:
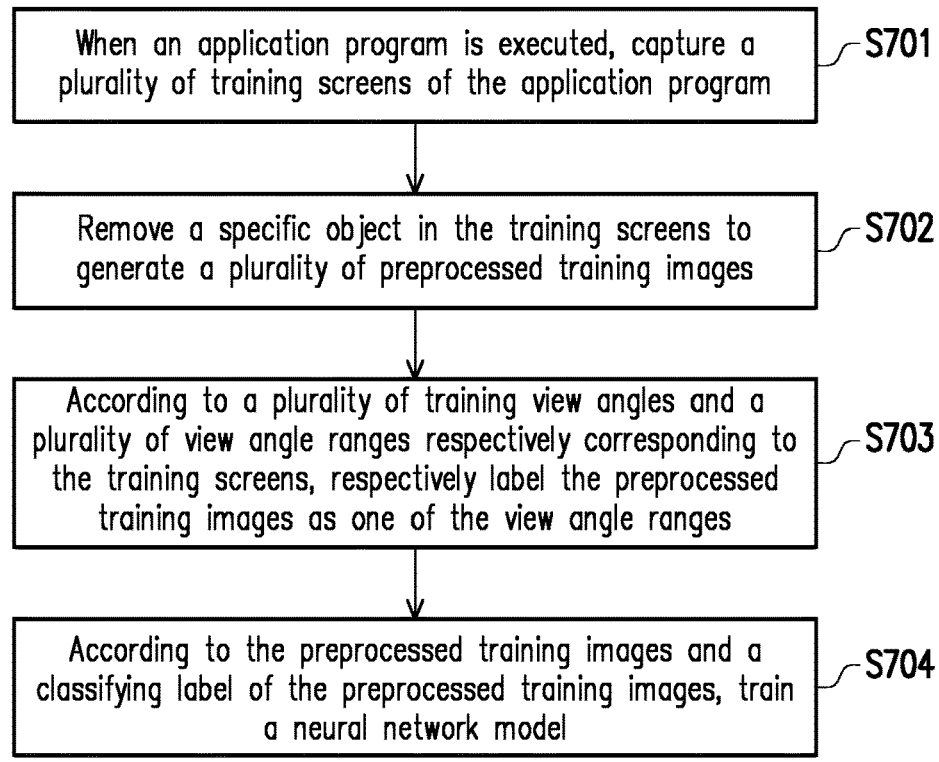
FIG. 7 is a flowchart of training a neural network model illustrated according to an embodiment of the invention.

FIG. 7 is a flowchart of training a neural network model illustrated according to an embodiment of the invention. Referring to FIG. 7, the process of the present embodiment is suitable for the electronic apparatus 10 of FIG. 1. The detailed process of training the neural network model is described below with reference to each element of the electronic apparatus 10. It should be noted that the processor 130 that trains the neural network model and actually recognizes the view angle of the first person view screen can be realized by a processor in one electronic apparatus or processors in a plurality of electronic apparatuses. The invention is not limited in this regard.

In step S701, when an application program is executed, the processor 130 captures a plurality of training screens of the application program. For example, the processor 130 can automatically generate a mouse control event to make a game program provide the plurality of training screens. The above-mentioned training screens are respectively labeled with a suitable training view angle. In step S702, the processor 130 removes a specific object in the training screens to generate a plurality of preprocessed training images. Here, the manner in which the processor 130 removes the specific object from the training screens is the same as the manner in which the processor 130 removes the specific object from the first person view screen in step S202. In other words, the processor 130 can also respectively cut the training screens into a plurality of sub training screens and take at least one sub training screen of each training screen to generate a plurality of preprocessed training images.

In step S703, according to a plurality of training view angles and a plurality of view angle ranges respectively corresponding to the training screens, the processor 130 labels each preprocessed training image as one of the view angle ranges to obtain a classifying label of each preprocessed training image. For example, if one training screen is labeled as having a 90-degree training view angle, the classifying label of that preprocessed training image of the training screen is a view angle range from 80 degrees to 100 degrees. Here, the processor 130 performs a labeling action on the preprocessed training image of each training screen to generate the classifying label of each preprocessed training image. In addition, the training view angle of the training screen can be provided by an application program generating the training screen or labeled by developers themselves. For example, the processor 130 can execute a mouse event simulation tool. The processor 130 can simulate a mouse event of mouse movement through the mouse event simulation tool and defines the training view angles according to a fixed movement unit. For example, the mouse event simulation tool can firstly simulate a mouse move-down event of large area movement, and label the training view angle of the training screen generated at the time as 0 degree. Then, the mouse event simulation tool can simulate a plurality of mouse move-up events regarding a gradual movement by a fixed unit and gradually increase an angle interval (for example, 1 degree) of the training view angle of the training screen generated in response to each of the mouse move-up events.

After the processor 130 generates a training data set including the plurality of preprocessed training images and the corresponding classifying labels, in step S704, the processor 130 trains the neural network model according to the preprocessed training images and the classifying labels of the preprocessed training images. Specifically, the processor 130 can input the preprocessed training images into the neural network model. By comparing classifying results with the classifying labels of the neural network model, the processor 130 will gradually obtain, through training, a set of rules (i.e., neural network model parameters) used to classify the preprocessed training images into one of the view angle ranges, and finally, establish the neural network model used to recognize view angles.

Based on the above, in the embodiments of the invention, after the first person view screen is preprocessed to remove the specific object, the preprocessed image can be input to the neural network model to recognize the view angle of the first person view screen. Here, by removing the specific object in the first person view screen, the recognition accuracy of the neural network model for recognizing the view angles of the displayed screen can be improved. In addition, after the view angle of the first person view screen is recognized, a specific function can be executed according to the view angle of the first person view screen to improve the functionality of the electronic apparatus. Further, by classifying the preprocessed image into one of the plurality of view angle ranges while ensuring the successful recognition rate of the neural network model and achieving the recognition accuracy to certain extent according to the embodiments of the invention, the calculation amount can be reduced and the processing efficiency can be improved.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A method for recognizing view angle of displayed screen, adapted to an electronic apparatus, comprising:
    displaying a first person view screen and capturing the first person view screen displayed by a display, wherein image content of the first person view screen is determined from three-dimensional scenario content;
    removing a specific object in the first person view screen to generate a preprocessed image excluding the specific object;
    inputting the preprocessed image excluding the specific object into a neural network model to recognize a view angle of the first person view screen, wherein the view angle is within a preset angle range; and
    performing a function according to the view angle of the first person view screen.

2. The method for recognizing view angle of displayed screen according to claim 1, wherein the step of removing the specific object in the first person view screen to generate the preprocessed image comprises:
    cutting the first person view screen into a plurality of sub-screens; and
    taking at least one of the sub-screens excluding the specific object to generate the preprocessed image.

3. The method for recognizing view angle of displayed screen according to claim 2, wherein the sub-screens comprise a left-side sub-screen, a middle sub-screen and a right-side sub-screen, and the step of taking at least one of the sub-screens excluding the specific object to generate the preprocessed image comprises:
    taking the left-side sub-screen and the right-side sub-screen to be spliced into the preprocessed image.

4. The method for recognizing view angle of displayed screen according to claim 1, wherein the function comprises providing an acousto-optic effect corresponding to the view angle or recording the view angle as a game operating history.

5. The method for recognizing view angle of displayed screen according to claim 1, wherein the step of inputting the preprocessed image into the neural network model to recognize the view angle of the first person view screen comprises:
   utilizing the neural network model to classify the preprocessed image into one of a plurality of view angle ranges.

6. The method for recognizing view angle of displayed screen according to claim 1, wherein the view angle of the first person view screen is a vertical pitch view angle.

7. The method for recognizing view angle of displayed screen according to claim 1, wherein the method further comprises:
   when an application program is executed, capturing a plurality of training screens of the application program;
   removing the specific object in the training screens to generate a plurality of preprocessed training images;
   according to a plurality of training view angles and a plurality of view angle ranges respectively corresponding to the training screens, respectively labeling the preprocessed training images as one of the view angle ranges; and
   according to the preprocessed training images and classifying labels of the preprocessed training images, training the neural network model.

8. An electronic apparatus, comprising:
   a display;
   a storage device;
   a processor, coupled to the display and the storage device, and configured to:
   displaying a first person view screen through the display and capture the first person view screen displayed by the display, wherein image content of the first person view screen is determined from three-dimensional scenario content;
   remove a specific object in the first person view screen to generate a preprocessed image excluding the specific object;
   input the preprocessed image excluding the specific object into a neural network model to recognize a view angle of the first person view screen, wherein the view angle is within a preset angle range; and
   perform a function according to the view angle of the first person view screen.

9. The electronic apparatus according to claim 8, wherein the processor is further configured to:
   cut the first person view screen into a plurality of sub-screens; and
   take at least one of the sub-screens excluding the specific object to generate the preprocessed image.

10. The electronic apparatus according to claim 9, wherein the sub-screens comprise a left-side sub-screen, a middle sub-screen and a right-side sub-screen, and the processor is further configured to:
   take the left-side sub-screen and the right-side sub-screen to be spliced into the preprocessed image.

11. The electronic apparatus according to claim 8, wherein the function comprises providing an acousto-optic effect corresponding to the view angle or recording the view angle as a game operating history.

12. The electronic apparatus according to claim 8, wherein the processor is further configured to:
   utilize the neural network model to classify the preprocessed image into one of a plurality of view angle ranges.

13. The electronic apparatus according to claim 8, wherein the view angle of the first person view screen is a vertical pitch view angle.

14. The electronic apparatus according to claim 8, wherein the processor is further configured to:
   when an application program is executed, capture a plurality of training screens of the application program;
   remove the specific object in the training screens to generate a plurality of preprocessed training images;
   according to a plurality of training view angles and a plurality of view angle ranges respectively corresponding to the training screens, respectively label the preprocessed training images as one of the view angle ranges; and
   according to the preprocessed training images and classifying labels of the preprocessed training images, train the neural network model.

* * * * *